J. HOPE.
BALL BEARING SCREW.
APPLICATION FILED FEB. 5, 1920.
1,357,562.
Patented Nov. 2, 1920.
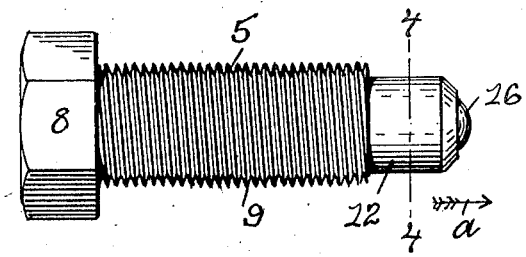
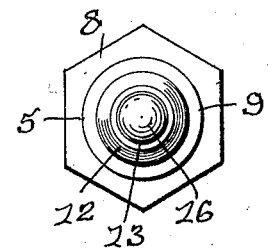
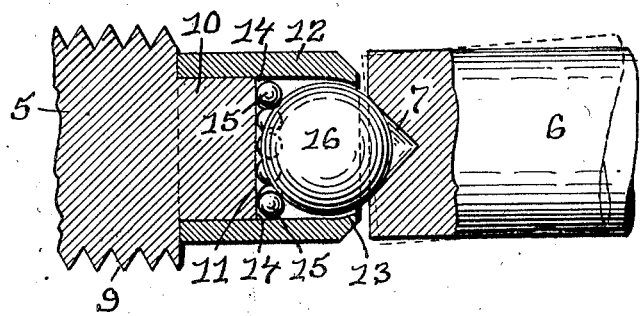
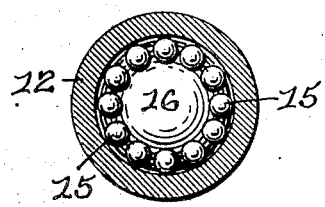
INVENTOR:
John Hope
By Chas. H. Luther
ATTORNEY.

UNITED STATES PATENT OFFICE.

JOHN HOPE, OF PROVIDENCE, RHODE ISLAND.

BALL-BEARING SCREW.

1,357,562.  Specification of Letters Patent.  Patented Nov. 2, 1920.

Application filed February 5, 1920. Serial No. 356,364.

*To all whom it may concern:*

Be it known that I, JOHN HOPE, a citizen of the United States, residing at Providence, in the county of Providence and State of Rhode Island, have invented a new and useful Improvement in Ball-Bearing Screws, of which the following is a specification.

In machines having bearings that must be accurately adjusted and in which a minimum of friction in the bearings must be obtained, it has been found that the usual form of ball-bearing is inadequate, as for instance, when the end of a shaft turns in a ball-bearing, the hardened balls will wear out the end of the shaft or throw the shaft out of its required accurate position.

The object of my invention is to construct a ball-bearing screw and a shaft or its equivalent in such a way that a ball, intermediate a row of balls and the end of the shaft, will revolve on the row of balls and turn with the shaft, thereby eliminating all wear on the shaft.

A further object of my invention is to simplify the construction of such a ball-bearing screw and shaft, thereby reducing the cost of manufacturing the same.

My invention consists in the peculiar and novel construction of a ball-bearing screw and shaft, said screw and shaft having details of construction, as will be more fully set forth hereinafter and claimed.

Figure 1 is a side view of my improved ball-bearing screw.

Fig. 2 is an end view of the screw.

Fig. 3 is an enlarged detail sectional view taken longitudinally through the ends of the screw and shaft and Fig. 4 is an enlarged transverse sectional view taken on line 4. 4 of Fig. 1 looking in the direction of the arrow *a* at the row of balls.

In the drawing 5 indicates my improved ball-bearing screw and 6 a shaft or its equivalent, having in its end a cone-shaped cavity 7, the walls of which are preferably at an angle of forty-five degrees.

The screw 5 has a head 8, screw-threaded portion 9 and reduced shouldered end portion 10 which has a flat end 11. A collar 12 having a slightly contracted open end 13 is forced on to the shouldered end portion 10 and with the flat end 11 forms a ball raceway 14, as shown in Fig. 3. A row of small balls 15. 15 are held in the raceway 14 and a large ball 16 rotates on the row of small balls 15. 15. The large ball enters the cone-shaped cavity 7 in the end of the shaft 6, the interior diameter of the collar 12 is larger than the diameter of the large ball 16, and the contracted open end 13 holds the balls in the end of the screw.

When in use the screw 5 screws through a fixed member, not shown, and after adjustment may be locked in the adjusted position by a nut, not shown, on the screw, bearing against the fixed member. The shaft 6 may also represent the hub of a wheel, pulley or any revolving member. In revolving the shaft 6 the large ball 16 revolves with the shaft and on the row of small balls 15. 15 thereby preventing wear on the shaft, and as the large ball touches only on the row of small balls, friction is reduced to a minimum. The shaft 6 may also be revolved at an angle to the bearing, as shown in broken lines in Fig. 3, and accomplish the same valuable result.

It is evident that my improved ball bearing screw can be used for an innumerable number of purposes, such as forming the centers in the head and tail stock of a lathe, &c.

Having thus described my invention I claim as new :—

1. A ball-bearing screw having a head end, a screw-threaded portion, a reduced shouldered end portion having a flat end, a collar on the reduced shouldered end portion, a raceway formed by the flat end of the shouldered end portion and the collar, a row of small balls in the raceway, a large ball in contact with the row of small balls and out of contact with the collar, said collar having a contracted open end, whereby the balls are held in their operative position in the end of the screw.

2. A ball-bearing structure comprising a screw having a head, a screw-threaded portion, an end in which is a cavity with a ball raceway, a row of small balls in the ball raceway, a large ball in contact with the row of small balls and out of contact with the walls of the cavity, means for holding the balls in the cavity, and a shaft having a cone-shaped cavity in its end and in contact with the large ball, whereby on revolving the shaft, the large ball will revolve with the shaft, on the row of small balls, in the ball raceway.

In testimony whereof, I have signed my name to this specification.

JOHN HOPE.